United States Patent
Zhou et al.

(10) Patent No.: US 10,060,404 B2
(45) Date of Patent: Aug. 28, 2018

(54) SYSTEM AND METHOD FOR DETECTING AN OPERATING MOTOR

(71) Applicant: BorgWarner Inc., Auburn Hills, MI (US)

(72) Inventors: Mingshe Zhou, Fishers, IN (US); Michael E. Kirk, Greenfield, IN (US); Kurt Wachowski, Clarkston, MI (US)

(73) Assignee: BORGWARNER INC., Auburn Hills, MI (US)

( * ) Notice: Subject to any disclaimer, the term of this patent is extended or adjusted under 35 U.S.C. 154(b) by 0 days.

(21) Appl. No.: 15/422,052

(22) Filed: Feb. 1, 2017

(65) Prior Publication Data
US 2018/0216595 A1    Aug. 2, 2018

(51) Int. Cl.
*H02P 6/10* (2006.01)
*F02N 11/08* (2006.01)
*B60R 16/02* (2006.01)

(52) U.S. Cl.
CPC .......... *F02N 11/0848* (2013.01); *B60R 16/02* (2013.01)

(58) Field of Classification Search
CPC .... H02P 1/00; H02P 6/00; H02P 41/00; H02P 27/04; H02P 23/00; H02P 6/10; H02K 17/00; H02K 19/00; H02K 21/00
USPC ..... 123/179.1, 179.25, 179.3; 320/104, 165; 417/10; 73/114.59; 74/139, 550; 307/10.6; 200/43.03; 318/400.01, 318/400.21, 400.22, 400.23, 701, 727; 180/287; 363/46
See application file for complete search history.

(56) References Cited

U.S. PATENT DOCUMENTS

| | | | |
|---|---|---|---|
| 4,415,812 A | 11/1983 | Griffith et al. | |
| 4,533,016 A * | 8/1985 | Betton | B60R 25/04 180/287 |
| 4,947,051 A * | 8/1990 | Yamamoto | F02N 11/0848 123/179.3 |
| 6,445,158 B1 | 9/2002 | Bertness et al. | |
| 6,661,195 B1 | 12/2003 | Schmidt et al. | |
| 6,914,413 B2 * | 7/2005 | Bertness | G01R 31/007 320/104 |
| 2007/0227237 A1 | 10/2007 | Brott et al. | |
| 2010/0101312 A1 * | 4/2010 | Raichle | F02N 11/10 73/114.62 |

FOREIGN PATENT DOCUMENTS

EP    0922855 A1    6/1999

OTHER PUBLICATIONS

International Search Report for International Application No. PCT/US2018/016349; dated May 21, 2018; 8 pages.
Written Opinion of the International Search Report for International Application No. PCT/US2018/016349; dated May 21, 2018, 2018; 6 pages.

\* cited by examiner

*Primary Examiner* — Antony M Paul
(74) *Attorney, Agent, or Firm* — Cantor Colburn LLP

(57) ABSTRACT

A system for detecting operation of a motor includes a ripple voltage detector module including a ripple voltage detector unit, an input operatively connected to the ripple voltage detector unit and connectable to an alternator, and an output operatively connected to the ripple voltage detector unit and connectable to a starter motor control system. The ripple voltage detector module provides a motor operation signal to the starter motor control system upon detection of a ripple voltage produced by the alternator.

7 Claims, 3 Drawing Sheets

SYSTEM AND METHOD FOR DETECTING AN OPERATING MOTOR

INTRODUCTION

Exemplary embodiments pertain to the art of motor systems and, more particularly, to a system and method for detecting an operating motor.

Many motor systems rely on starter motors to initiate operation. Upon activation of the starter motor, a gear is brought into meshing engagement with, for example, a fly wheel of the motor. The gear is rotated causing a corresponding rotation of the fly wheel to initiate operation of the motor. Once the motor is in operation, it is undesirable to re-engage the starter motor. Shifting the gear into engagement with a rotating fly wheel could result in damage to the starter motor. In order to prevent undesirable activation of the starter motor, many motor systems include a system for detecting motor operation.

Certain systems for detecting motor operation may detect movement of various rotating parts such as crankshafts, cams shafts and the like. Such systems add to an overall motor system cost by requiring a sensor to detect movement of the rotating part as well as periodic maintenance. Other systems may monitor output voltage from an alternator. If output voltage is above a certain threshold value, the motor may be deemed to be in operation and the starter motor prevented from activating. Occasionally, systems associated with the motor may represent a load causing a voltage drop that draws output voltage below the threshold value while the motor is operating. At such times, the starter motor could be activated and the gear sent toward a rotating fly wheel.

SUMMARY

Disclosed is a system for detecting operation of a motor including a ripple voltage detector module including a ripple voltage detector unit, an input operatively connected to the ripple voltage detector unit and connectable to an alternator, and an output operatively connected to the ripple voltage detector unit and connectable to a starter motor control system. The ripple voltage detector module provides a motor operation signal to the starter motor control system upon detection of a ripple voltage produced by the alternator.

Also disclosed is a motor system including a motor, a starter motor mechanically connected to the motor, a starter motor control system operatively connected to the starter motor, and an alternator operatively connected to the motor. The alternator is operable through operation of the motor to produce a voltage. A motor operation detector system is operatively connected to the motor. The motor operation detector system is operable to detect motor operation and includes a ripple voltage detector module having a ripple voltage detector unit, an input operatively connected to the ripple voltage detector unit and the alternator, and an output operatively connected to the ripple voltage detector unit and the starter motor control system. The ripple voltage detector module provides a motor operation signal to the starter motor control system upon detection of ripple voltage produced by the alternator.

Further disclosed is a method of detecting motor operation including monitoring a motor system component for an electrical signal, detecting ripple voltage from the motor system component, and preventing activation of a starter motor based on detecting the ripple voltage.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
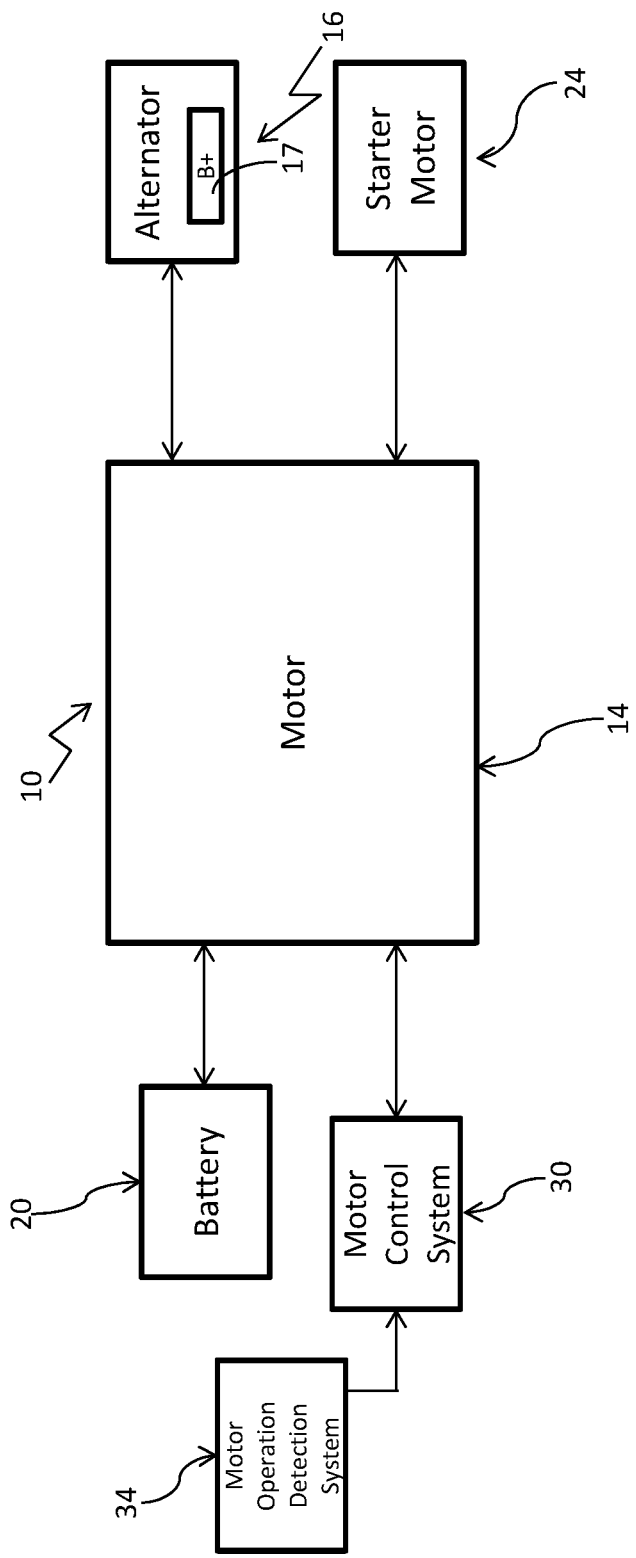
FIG. 1 depicts a block diagram of a motor system including a motor operation detector system, in accordance with an exemplary embodiment.

The following description is merely exemplary in nature and is not intended to limit the present disclosure, its application or uses. It should be understood that throughout the drawings, corresponding reference numerals indicate like or corresponding parts and features.

A motor system, in accordance with an exemplary embodiment, is indicated generally at 10 in FIG. 1. Motor system 10 includes a motor 14 operatively connected to a alternator 16 having a B+ output terminal 17 that provides a charging current to a battery 20. Motor 14 takes the form of an internal combustion engine that may operate on a variety of fuels such as gasoline, diesel fuel, or the like. Motor 14 may be employed in a wide array of systems including vehicles such as cars, trucks and ships, as power for a generator, and the like. Motor system 10 includes a starter motor 24 that may be selectively activated to provide a motive force to initiate operation of motor 14. Starter motor 24 is mechanically linked to motor 14 and electrically connected to battery 20.

Motor system 10 also includes a starter motor control system 30 that may selectively activate starter motor 24 upon receiving an input from, for example, an ignition system (not shown). Starter motor control system 30 may also operate to prevent activation of starter motor 24 if motor 14 is in operation. In this manner, starter motor control system 30 operates to prevent damage associated with attempting to engage a pinion gear (not shown) of starter motor 24 with a rotating ring gear (also not shown) of motor 14.

In accordance with an aspect of an exemplary embodiment, motor 14 includes a motor operation detection system 34 operatively connected to starter motor control system 30. Motor operation detection system 34 provides a motor operation signal to starter motor control system 30 if motor 14 is running. The motor operation signal may be associated with voltage produced by alternator 16. That is, as alternator 16 is driven by motor 14, a voltage output may provide an indication of motor operation.

Figure 2:
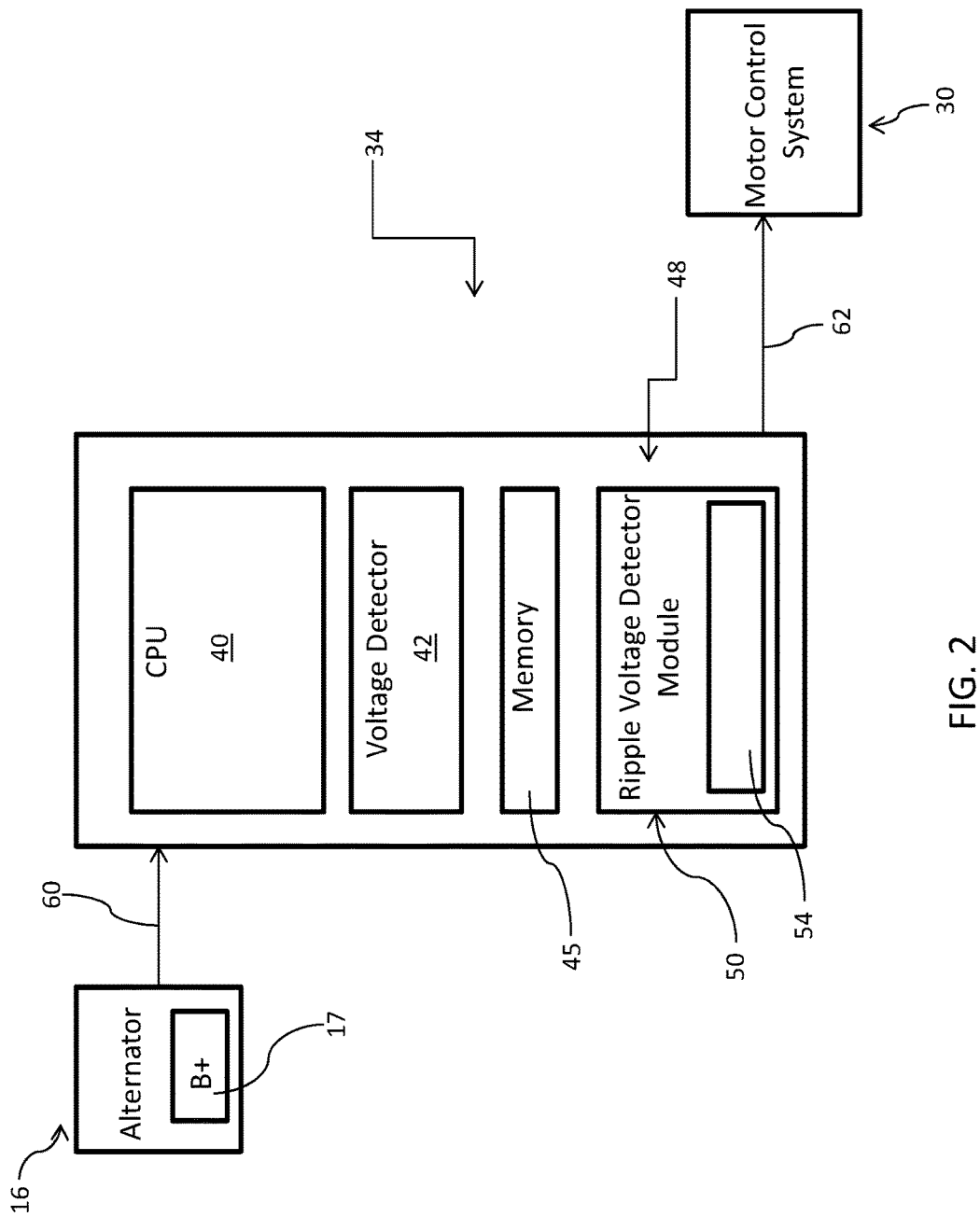
FIG. 2 depicts a block diagram of the motor operation detector system including a ripple voltage detector module, in accordance with an exemplary embodiment.

Referring to FIG. 2, motor operation detection system 34 includes a processor 40, a voltage detector 42 connected to processor 40 and, for example, to alternator 16, and a memory 45. Memory 45 may store a predetermined threshold voltage value associated with motor 14. If, for example, voltage output from alternator 16 is above the predetermined threshold value, motor 14 may be deemed to be in operation. Alternatively, if voltage output from alternator 16 is below the predetermined threshold value, motor 14 may be deemed to not be in operation. It is to be understood that while shown in FIG. 2 as discrete components, motor operation detection system 34 may be fully integrated with alternator 16.

It has been found that various electrical loads associated with motor system 10 may cause a voltage drop such that output voltage is below the predetermined threshold while motor 14 is in operation. Under such circumstances, motor operation detection system 34 may provide a false negative output to starter motor control system 30. In order to prevent a false negative from allowing operation of starter motor 24, motor operation detection system 34 includes a ripple voltage detector unit 48, in accordance with an aspect of an exemplary embodiment.

In accordance with an aspect of an exemplary embodiment, ripple voltage detector unit 48 includes a ripple voltage detector module 50, which includes a voltage divider circuit 54 that senses the existence of ripple voltage. Ripple voltage exists at B+ output terminal 17 as long as alternator 16 is producing voltage regardless of the existence of electrical loads. Accordingly, motor operation detection system 34 includes an input 60 coupled to B+ output terminal 17. If ripple voltage is present at B+ output terminal 17, motor operation detection system 34 may provide a signal to starter motor control system 30. It is to be understood that the signal may be an instruction, such as through software passed internally of motor operation detection system 34 or a physical signal that is passed through output 62. The signal would indicate that motor 14 is in operation and that starter motor 24 should be prevented from being activated and/or operation of starter motor 24 may be inhibited.

Figure 3:
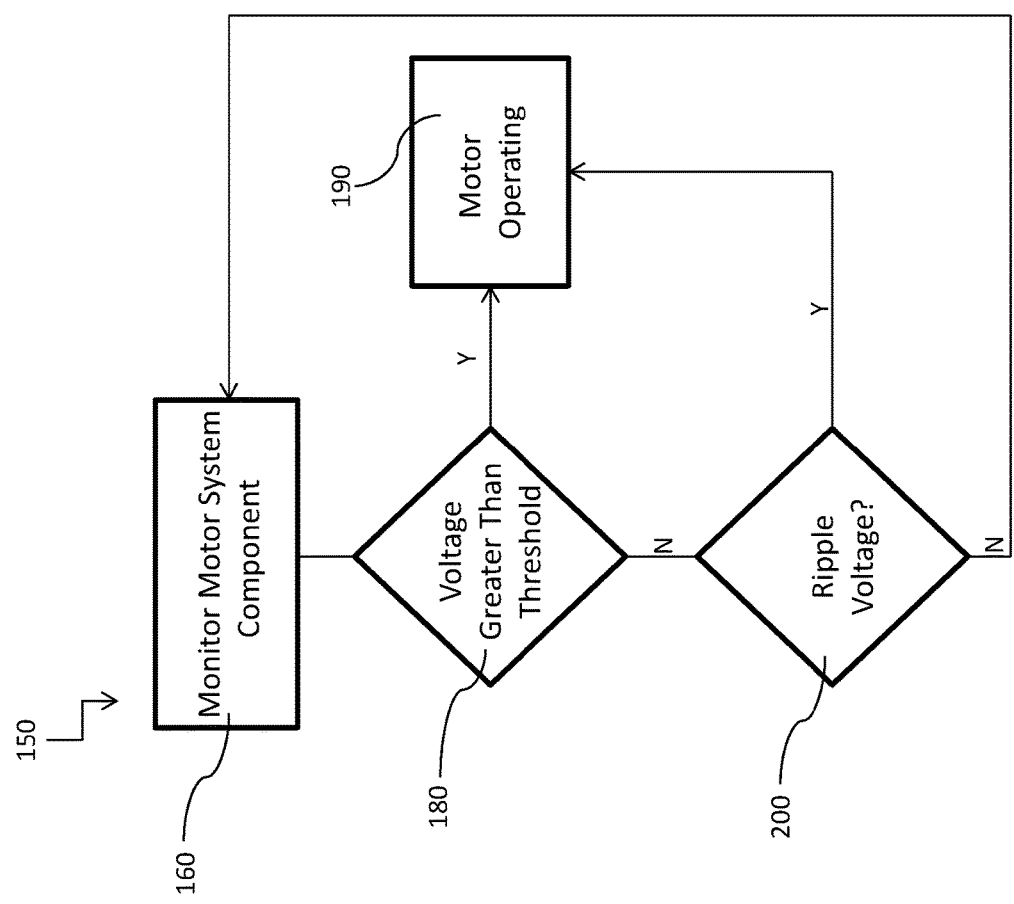
FIG. 3 depicts a block diagram illustrating a method of controlling operation of a starter motor, in accordance with an aspect of an exemplary embodiment.

Reference will now follow to FIG. 3 in describing a method 150 of detecting motor operation in accordance with an aspect of an exemplary embodiment. In block 160 motor operation detection system 34 monitors a motor system component for an electrical signal such as voltage. In accordance with an aspect of an exemplary embodiment, motor operation detection system 34 monitors B+ output terminal 17 of alternator 16 in block 160. If, in block 180, voltage is present at a level above the predetermined threshold, motor operation detection system 34 signals, in block 190, starter motor control system 30 to prevent operation of starter motor 24.

If, in block 180, voltage is below the predetermined threshold, motor operation detection system 34 determines, in block 200 whether ripple voltage exists. If ripple voltage exists, motor operation detection system 34 outputs a signal to starter motor control system 30 in block 190 to prevent operation of starter motor 24. If no ripple voltage is present, motor operation detection system 34 continues to monitor the motor system 10 at block 160.

At this point it should be understood that exemplary embodiments describe a system that relies upon sensing ripple voltage from a motor system component to determine whether a motor is in operation. It should also be understood that while described as working in cooperation with sensing a voltage value relative to a threshold level, the detection of ripple voltage may be the only input used to determine whether a motor is in operation.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the invention not be limited to the particular embodiments disclosed, but will include all embodiments falling within the scope of the application.

What is claimed is:

1. A system for detecting operation of a motor comprising:
   a ripple voltage detector module including a ripple voltage detector unit;
   an input operatively connected to the ripple voltage detector unit and connectable to an alternator; and
   an output operatively connected to the ripple voltage detector unit and connectable to a starter motor control system, wherein the ripple voltage detector module provides a motor operation signal to the starter motor control system upon detection of a ripple voltage produced by the alternator.

2. The system for detecting operation of a motor according to claim 1, wherein the ripple voltage detector unit includes a voltage divider circuit.

3. A motor system comprising:
   a motor;
   a starter motor mechanically connected to the motor;
   a starter motor control system operatively connected to the starter motor;
   an alternator operatively connected to the motor, the alternator being operable through operation of the motor to produce a voltage; and
   a motor operation detector system operatively connected to the motor, the motor operation detector system being operable to detect motor operation and comprises:
     a ripple voltage detector module including a ripple voltage detector unit;
     an input operatively connected to the ripple voltage detector unit and the alternator; and
     an output operatively connected to the ripple voltage detector unit and the starter motor control system, wherein the ripple voltage detector module provides a motor operation signal to the starter motor control system upon detection of ripple voltage produced by the alternator.

4. The motor system according to claim 3, wherein the ripple voltage detector unit includes a voltage divider circuit.

5. The motor system according to claim 3, wherein the motor is part of a vehicle.

6. The motor system according to claim 3, wherein the starter motor control system is operable to prevent operation of the starter motor upon receipt of the motor operation signal.

7. The motor system according to claim 3 wherein the alternator includes a B+ output terminal operatively connected to the input.

* * * * *